United States Patent [19]
Tresch et al.

[11] 3,744,599
[45] July 10, 1973

[54] DOUBLE-ACTING, SHORT-STROKE, LOW-PRESSURE DAMPING DEVICE

[75] Inventors: Charles Henri Tresch, Le Vallon-Eguilles; Aimé Michel Hancart, Marignane, both of France

[73] Assignee: Societe Nationale Industrielle Aerospatiale, Paris, France

[22] Filed: Dec. 15, 1971

[21] Appl. No.: 208,151

[30] Foreign Application Priority Data
Dec. 17, 1970 France .............................. 7045582

[52] U.S. Cl. ................................ 188/298, 188/312
[51] Int. Cl. .............................................. F16f 9/04
[58] Field of Search .................. 188/298, 312, 314, 188/315, 316, 322

[56] References Cited
UNITED STATES PATENTS
3,189,133   6/1965   Dillenburger ...................... 188/298

FOREIGN PATENTS OR APPLICATIONS
575,715   4/1932   Germany ........................... 188/298

Primary Examiner—Allen N. Knowles
Attorney—John J. McGlew et al.

[57] ABSTRACT

The invention relates to a double-acting, short-stroke linear damping device involving the throttling of a fluid, characterized by a plurality of elemental damping means grouped together in a common housing and associated to means for recovering leaks and for compensating for variations in the volume of the fluid, and to means for attachment to mutually movable members.

6 Claims, 3 Drawing Figures

DOUBLE-ACTING, SHORT-STROKE, LOW-PRESSURE DAMPING DEVICE

The technical province of this invention is that of fluid-type dampers.

Already known are single-piston dampers and movable piston of which is guided through at least one sealing bearing for motion within a chamber of matching shape. A leakage process which effects a throttling of a fluid bathing said piston and is the result of the displacement caused by the piston motion, is accomplished either by means of valves or a plurality of calibrated orifices, or by means of the clearance between the piston and the wall of said chamber. Compensation for the leaks between moving parts and bearings usually requires the provision of a fluid reservoir, thereby making the device more cumbersome and less reliable.

Likewise known are devices of the oleopneumatic kind having a floating piston between a compressible fluid and a non-compressible fluid, or single-piston devices with throttling means external to the cylinder with separate valve enclosures and piping, or friction-type damping devices, or devices utilizing the compression and remanent decompression of certain elastomers, or others still in which the throttling of a fluid is combined with the compression and expansion of elastomer elements.

All of these known arrangements have drawbacks. Some are heavy and complex, hence costly to set up and operate ; others use elements sensitive to temperature and fatigue. Generally speaking, the reliability of these known devices is poor and can be relatively improved only by a very-high-precision machining of high-grade materials.

The present invention has for its object a device which obviates these drawbacks and accordingly relates to a double-acting, short-stroke, low-pressure damping device, characterized by the fact that it is formed by a series of elemental dampers, preferably arranged in line, having pistons supported on the same rod and each piston cooperating with its own chamber, in which the throttling of a fluid is effected in the annular space formed by the clearance between each piston and its own cylinder.

In a preferred embodiment, the pistons assume the form of equidistant plates carried on a rod, and these plates are surrounded by chambers formed in abutting half-cylindrical shells restrained in a cylindrical enclosure.

This arrangement is preferably provided with combined means permitting recovery of the fluid and compensation for variations in the volume of the fluid, whereby to devise a very simple device which is very light and highly reliable and requires no maintenance.

The scope of application for such a device includes the damping of all low-amplitude linear motions and more particularly the damping of helicopter rotor blade oscillations in the rotation plane of the rotor, which oscillations are known as drag oscillations and are encountered during the phases of speeding up and slowing the rotor and during forward flight of the helicopter.

The description which follows of a non-limitative exemplary embodiment of a damper devised as disclosed above, given with reference to the accompanying drawing, will give a clear understanding of how the invention can be carried into practice.

Figure 1:
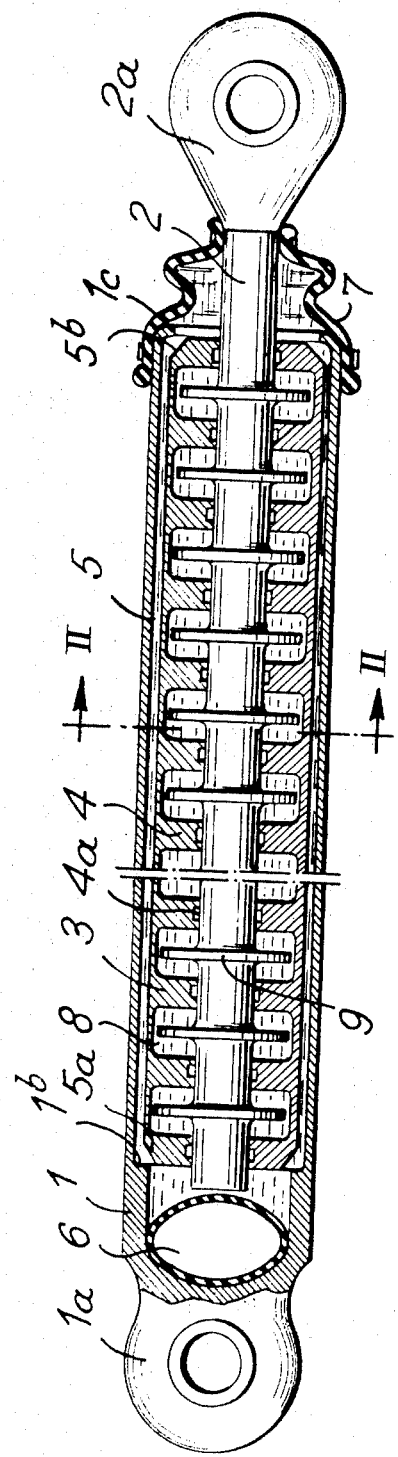
FIG. 1 shows a damper according to the invention in longitudinal axial section, with partial lengthwise cutaway.

The damper shown in the drawing consists of a metal cylinder 1 and a metal rod 2, each having an attachment means (1a and 2a respectively) at one end for transmitting and absorbing the motions to be damped. In the illustrated exemplary embodiment, these attachment means are hinging eyes.

Contained within cylinder 1 is a unit 3 made of a synthetic plastic in the form of two shells 3a and 3b shaped externally as half-cylinders and joined together over a diametrical plane.

Formed inside these shells are internal equidistant walls 4, and on the exterior of said shells is a groove forming a longitudinal channel 5.

Formed between the walls 4 are cylindrical cells 8, and rod 2 supports similarly equidistant circular plates 9, each plate being contained with clearance in an associated cell whereby to form therein a piston having a diameter less than that of said cell.

The rod 2 is guided by the bearing-forming central portions of the walls 4, and each such central portion embodies a groove 4a forming a sealing baffle between adjacent cells by virtue of pressure loss.

The bore of cylinder 1 has a diameter equal to the outer diameter of the assembly 3. Having first been fitted over the rod 2 and filled with a damping fluid, the assembly 3 is slipped into this bore and pressed against an end abutment 1b and restrained by crimping of the other end, the crimping means consisting of a portion 1c of the wall of cylinder 1 bent downwardly over the corresponding end of assembly 3.

Adjacent the abutment 1b and the crimping 1c, the ends of channels 5 have deepened portions 5a and 5b permitting circulation of the damping fluid.

At the place where rod 2 is inserted into cylinder 1 is provided a sealing bellows 7 made of an elastomer and having a wider end engaged over the cylinder 1 and a narrower end engaged over the rod 2, both ends being sealingly restrained by means of clips.

At the end of the bore through cylinder 1, which end is substantially hemispherically shaped, is placed a bladder 6 containing a gas which is thus separated from the damping liquid.

The arrangement consisting of the bellows 7, the channels 5, the bore through cylinder 1 and the bladder 6, is used to recover possible leaks through the end bearings of the assembly 3 and chiefly to compensate for variations in the volume of the fluid, notably when the rod 2 moves in relation to the cylinder.

The bladder 6 is filled with a gas such as nitrogen, substantially at atmospheric pressure. It compensates for fluid transfers from the bellows into the cylinder bore, and vice versa.

In order to assemble the device, the rod 2 and the assembly 3 are assembled and dipped into a tank filled with the fluid to be contained in the cells 8. The rod 2 and the assembly 3 are kept immersed therein and are inserted into the cylinder 1 containing its bladder 6 and likewise dipping into the fluid, whereupon the bellows 7 is fitted.

When the eye 2a is subjected to a force, the plates 9, in the course of their motion, exert a throttling effect on the fluid contained in the cells between the inner walls thereof and the peripheries of the plates 9. The clearance between these inner walls and peripheries may vary between 0.1 and 1 mm, for example, depending on the degree of damping required and the viscosity of the fluid used. The number of plates and cells is determined according to the magnitude of the forces which produce the motions to be damped.

During the damper compression phases, the fluid is transferred from the bellows 7 to the end cavity of cylinder 1 through the channels 5, and the bladder 6 is compressed. During damper extensions, the bladder expands and forces back the fluid towards the bellows 7.

Figure 3:
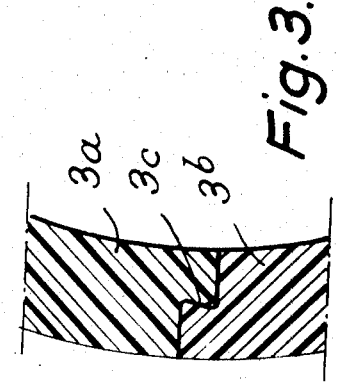
FIG. 3 shows on an enlarged scale a detail of the junction at the edges of the shells.
Figure 2:
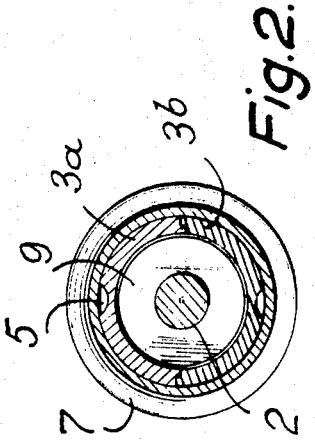
FIG. 2 is a cross-section taken through the line II—II of FIG. 1.

The joint between the shells 3a and 3b can be effected by any convenient means, either in flat contact as shown in FIG. 2, or by means of a male and female joint formed with a step 3c, as shown in FIG. 3. Alternatively, other means may be used, featuring lips, a variety of linings, mutually engaging means, elastic latchings, and the like.

The material used for the shells may be that known by the trade-name "Rilsan," or any other convenient plastic having a good coefficient of friction or self-lubricating properties with respect to the rod, in conjunction with adequate stiffness.

In cases where it is required to damp short-travel motions of the order of one centimeter, for example, the multiplicity of damping cells formed by the cavities 8 and the plates 9 results in a reduction in the pressure of the fluid in each cell and a wide latitude in determining large operating clearances between the plates and the cells. This is an important advantage since manufacture of the subject device of this invention involves no difficult choice of materials or accurate machining operations.

This results in the following improvements :

Elimination of sealing devices between parts in relative motion, the sealing between adjacent cells being assured merely by a proper fit between the bearings and the rod. The customary backlash resulting from the movement and elasticity of conventional seals in their grooves is eliminated. Reduced weight of the damper, since the cell walls, which are subjected to low pressures individually, can be made of low-density plastics. Elimination of contact between the piston and cylinder, thereby eliminating wear and corrosion at these places. Elimination of external seals between the moving compound and the cylinder of the damper. This function is performed by the bellows, so that the damper can be filled once and for all for its entire useful life, while the absence of leaks allows dispensing with a replacement-fluid reservoir. The permanently filled state of the damper avoids all danger of lost motion which might have resulted from a defective supply of fluid. Simplified construction. Since the clearance between the piston and the cylinder can be greater than in the case of conventional dampers, the component parts can be made less accurately. Further, the succession of cells and plates makes it possible to design parts having simple and repetitive shapes.

It goes without saying that changes and substitutions of parts may be made in the preferred exemplary embodiment hereinbefore described, without departing from the scope of the invention.

What we claim is :

1. In a double-acting, short-stroke damping device for damping motions between a moving member and a thrust point thereof and involving the throttling of a fluid, in combination, a plurality of elemental damping means forming a compound contained in a common body, leak recovery means, means for compensating for variations in the volume of said fluid, and first and second attachment means to the moving member and to the thrust point thereof, whereby oscillations therebetween are damped, the set of elemental damping means being provided linearly in repetitive series along a straight common axis, each elemental damping means comprising a closed cylindrical cell with end walls and a piston fast with a rod which slidingly and substantially sealingly extends through said end walls, through bearings provided therein, said cell being filled with said fluid and the ratio between the piston and cell diameters being so chosen as to provide a predetermined throttling clearance for said fluid.

2. A device as claimed in claim 1, wherein said cells are rigidly interconnected by their common walls and said pistons are rigidly interconnected by a rod one end of which is provided with a first attachment means, the second attachment means being provided at the opposite end on said body.

3. A device as claimed in claim 2, wherein said cells are identical and are provided as a compound having a symmetrical axis of revolution and formed by uniting two half-cylinder-shaped shells in such manner that their edges join over a diametrical plane of said compound.

4. A device as claimed in claim 3, wherein said compound is restrained within a hollow cylindrical body having a closed end provided with said second attachment means and an open end through which said rod extends.

5. A device as claimed in claim 3, wherein said compound is restrained in its body by pressure contact against an abutment adjacent said closed end and by crimping beneath the edge of said open end of said body.

6. A device as claimed in claim 2, wherein said means for recovering leaks and for compensating for variations in the volume of said fluid are formed by a cavity contained in said body adjacent the closed end thereof, by a gas-containing bladder positioned in said cavity and bathing in the fluid filling the same, by a sealing and deformable bellows which encloses a bladder-remote open end and a place where said rod is inserted thereinto, said bellows being sealingly assembled to said body and to said rod and likewise filled with said fluid, and by at least one channel between said compound and said body for communicating said cavity with the space within said bellows, said channel being likewise filled with said fluid.

* * * * *